United States Patent
Xu

(10) Patent No.: US 9,521,189 B2
(45) Date of Patent: Dec. 13, 2016

(54) PROVIDING CONTEXTUAL DATA FOR SELECTED LINK UNITS

(71) Applicant: Google Inc., Mountain View, CA (US)

(72) Inventor: Jinjun Xu, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 207 days.

(21) Appl. No.: 13/972,457

(22) Filed: Aug. 21, 2013

(65) Prior Publication Data

US 2015/0058358 A1    Feb. 26, 2015

(51) Int. Cl.
*G06F 7/00*     (2006.01)
*G06F 17/30*    (2006.01)
*H04L 29/08*    (2006.01)

(52) U.S. Cl.
CPC ......... *H04L 67/10* (2013.01); *G06F 17/30699* (2013.01); *G06F 17/30893* (2013.01); *H04L 67/02* (2013.01); *H04L 67/2838* (2013.01)

(58) Field of Classification Search
CPC .................. G06F 17/30699; G06F 17/30893; G06F 17/30861
See application file for complete search history.

(56) References Cited

U.S. PATENT DOCUMENTS

| | | | | |
|---|---|---|---|---|
| 5,307,266 A | * | 4/1994 | Hayashi et al. | 715/201 |
| 5,761,496 A | * | 6/1998 | Hattori | G06F 17/30684 707/796 |
| 5,895,461 A | * | 4/1999 | De La Huerga | G06F 17/22 |
| 5,917,490 A | * | 6/1999 | Kuzunuki | G06F 3/017 715/775 |
| 5,930,802 A | * | 7/1999 | Lee | G06F 17/30274 |
| 6,070,164 A | * | 5/2000 | Vagnozzi | G06F 17/30324 |
| 6,226,645 B1 | * | 5/2001 | Bae | G06F 17/30616 |
| 6,873,982 B1 | * | 3/2005 | Bates | G06F 17/30648 707/737 |
| 7,065,520 B2 | * | 6/2006 | Langford | 707/769 |
| 7,162,493 B2 | * | 1/2007 | Weiss et al. | |
| 7,233,955 B2 | * | 6/2007 | Machida et al. | |
| 7,296,021 B2 | * | 11/2007 | Malkin et al. | |
| 7,376,709 B1 | * | 5/2008 | Brei et al. | 709/218 |
| 7,505,969 B2 | * | 3/2009 | Musgrove | G06Q 30/02 |
| 7,685,199 B2 | * | 3/2010 | Chandrasekar | G06F 17/30663 707/602 |

(Continued)

OTHER PUBLICATIONS

Phuong et al., A Keyword-topic Model for Contextual Advertising, SoICT 2012, Aug. 23-24, pp. 63-70.

*Primary Examiner* — Daniel Kuddus
(74) *Attorney, Agent, or Firm* — Fish & Richardson P.C.

(57) ABSTRACT

Link units include a keyword or words that, when selected, cause a client device to display a landing page having one or more content items related to the selected link unit. The use of contextual data in addition to the keyword or words of the selected link unit may further assist in selecting relevant content items to populate the landing page. The contextual data may include the unselected keyword link units and/or other keywords in a group from which the selected keyword link unit was selected. The contextual data may include assigning weights to the selected keyword link unit, the unselected keyword link units, and/or the other keywords in the group from which the selected keyword link unit was selected. The group may be identified using a unique token associated with the group and the selected keyword link unit.

10 Claims, 9 Drawing Sheets

(56) References Cited

U.S. PATENT DOCUMENTS

| | | | |
|---|---|---|---|
| 8,051,080 B2* | 11/2011 | Kraft | G06F 17/30864 707/736 |
| 8,209,333 B2 | 6/2012 | Hubbard et al. | |
| 8,468,063 B2* | 6/2013 | Danzan | G06Q 30/08 705/26.1 |
| 8,468,083 B1* | 6/2013 | Szulczewski | G06Q 30/02 705/36 R |
| 8,620,929 B2* | 12/2013 | Shon | G06F 17/30864 707/732 |
| 2002/0055940 A1* | 5/2002 | Elkan | G06F 17/30867 |
| 2005/0177455 A1* | 8/2005 | De Lury et al. | 705/26 |
| 2007/0038614 A1* | 2/2007 | Guha | G06Q 30/0256 |
| 2007/0198506 A1* | 8/2007 | Attaran Rezaei | G06F 17/30675 |
| 2008/0275861 A1* | 11/2008 | Baluja | G06N 5/02 |
| 2008/0275899 A1* | 11/2008 | Baluja | G06Q 30/02 |
| 2009/0024700 A1* | 1/2009 | Garg et al. | 709/203 |
| 2010/0228693 A1* | 9/2010 | Dawson et al. | 706/12 |
| 2011/0040768 A1* | 2/2011 | Shon | G06F 17/30864 707/749 |
| 2011/0047163 A1* | 2/2011 | Chechik | G06F 17/30781 707/741 |
| 2011/0112916 A1* | 5/2011 | Baluja | G06Q 30/02 705/14.73 |
| 2011/0213655 A1* | 9/2011 | Henkin | G06Q 30/00 705/14.49 |
| 2011/0258204 A1* | 10/2011 | Hubbard | G06Q 30/02 707/749 |
| 2012/0095834 A1* | 4/2012 | Doig et al. | 705/14.53 |
| 2013/0066709 A1* | 3/2013 | Riley | G06F 17/30616 705/14.42 |
| 2013/0110627 A1 | 5/2013 | Guha | |

* cited by examiner

PROVIDING CONTEXTUAL DATA FOR SELECTED LINK UNITS

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a client device over the Internet. Additional third-party content can be provided by third-party content providers for presentation on the client device together with the first-party content provided by the first-party content providers. Thus, a person viewing a resource can access the first-party content that is the subject of the resource, as well as the third-party content that may or may not be related to the subject matter of the resource.

SUMMARY

Link units include a keyword or words that, when selected, cause a client device to display a landing page having additional content items related to the selected link unit. That is, a link unit for "Food" may, when selected, result in a landing page being displayed with content items, such as advertisements, that are related to the word "Food." Link units are selected to be displayed on a page based on an analysis of the content of the page. The use of contextual data based on the content of the page in addition to the selected keyword or words may further assist in selecting relevant content items to populate the landing page.

One implementation relates to a computer readable storage device storing instructions that, when executed by one or more data processors, cause the one or more data processors to perform several operations. The operations include receiving a set of keyword link units and receiving a selection of a keyword link unit of the set of keyword link units. The operations further include assigning a first weight to the selected keyword link unit and assigning a second weight to an unselected keyword link unit of the set of keyword link units. The operations include transmitting, to a content item selection system, a request for content items to populate one or more content item slots of a landing page. The request includes the selected keyword link unit, the assigned first weight, the unselected keyword link unit, and the assigned second weight. The operations include receiving data to effect presentation of a set of content items selected based, at least in part, on the selected keyword link unit, the assigned first weight, the unselected keyword link unit, and the assigned second weight to populate the one or more content item slots of the landing page.

Another implementation relates to a system for populating a landing page with content items. The system includes one or more data processors and one or more storage devices storing instructions that, when executed by the one or more data processors, cause the one or more data processors to perform several operations. The operations include receiving a set of groups of keywords associated with a resource. Each group of the set of groups of keywords is each associated with a unique token for the group. The operations further include selecting a keyword for each group to be displayed as a keyword link unit. The operations include transmitting a set of keyword link units based on the selected keywords and a corresponding unique token for each keyword link unit to a client device. The operations include receiving data indicative of a corresponding unique token for a selected keyword link unit from the client device. The operations include identifying a group of keywords from the set of groups of keywords based on the corresponding unique token. The operations further include assigning weights to one or more of the keywords of the identified group of keywords. The operations include selecting one or more content items based, at least in part, on the one or more keywords and the assigned weights. The operations include transmitting data to effect presentation of the one or more selected content items to the client device.

Yet another implementation relates to a computer readable storage device storing instructions that, when executed by one or more data processors, cause the one or more data processors to perform several operations. The operations include receiving data for a resource and determining a set of groups of keywords based on an analysis of the data for the resource. The operations include selecting a keyword for each group to be displayed as a keyword link unit. The operations further include transmitting a set of keyword link units based on the selected keywords to a client device. The operations include receiving data indicative of a selected keyword link unit from the client device. The operations include assigning a first weight to the selected keyword link unit and a second weight to unselected keyword link units. The operations further include selecting one or more content items based, at least in part, on the selected keyword link unit, the assigned first weight, the unselected keyword link units, and the assigned second weight. The operations include transmitting data indicative of the one or more selected content items to the client device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
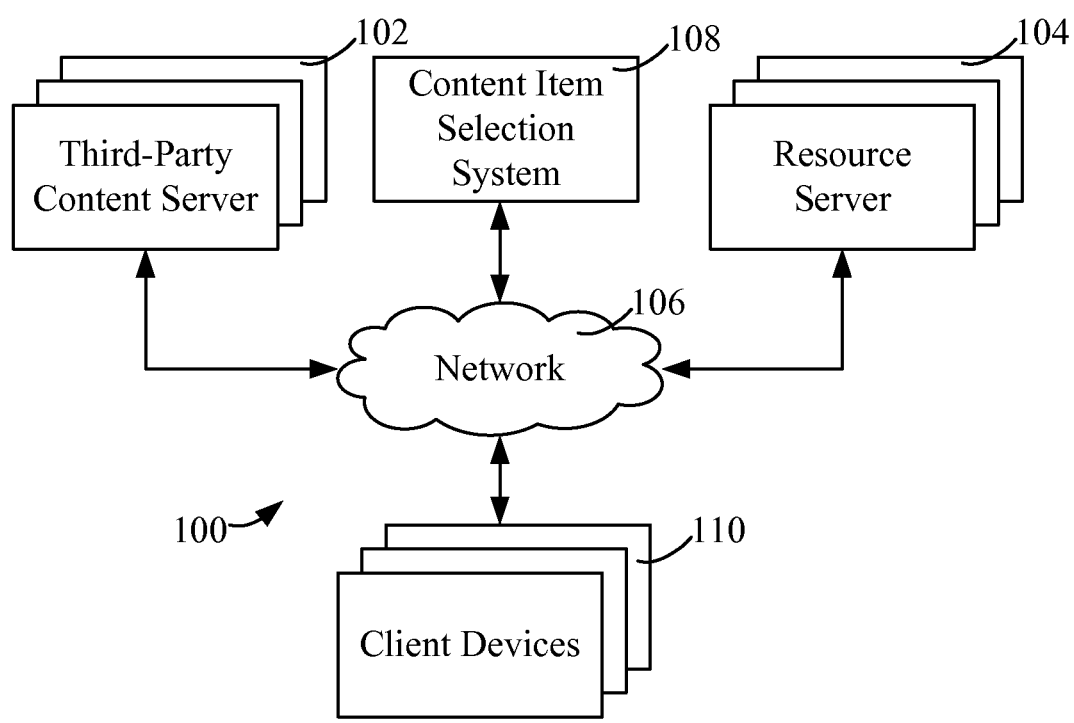
FIG. 1 is an overview illustration of an example of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a client device) can view a resource, such as a web page, via the Internet by communicating with a server, such as a web page server, corresponding to that resource. The resource includes first-party content that is the subject of the resource from a first-party content provider and may include additional third-party provided content, such as advertisements or other content. In one implementation, responsive to receiving a request to access a web page, a web page server and/or a client device can communicate with a data processing system, such as a content item selection system, to request a third-party content item to be presented with the requested web page. The content item selection system can select a third-party content item and provide data to effect presentation of the content item with the requested web page on a display of the client device. In some instances, the content item is selected and served with a resource associated with a search query response. For example, a search engine may return search results on a search results web page and may include third-party content items related to the search query in one or more content item slots of the search results web page.

In some instances, a device identifier is associated with the client device. The device identifier may include a randomized number associated with the client device to identify the device during subsequent requests for resources and/or content items. In some instances, the device identifier is configured to store and/or cause the client device to transmit information related to the client device to the content item selection system and/or resource server (e.g., a web browser type, an operating system, prior resource requests, prior content item requests, etc.).

For situations in which personal information about the user of the client device is collected or used to select third-party content, the user may be provided with an opportunity to control whether programs or features that may collect personal information (e.g., information about a user's social network, social actions or activities, a user's preferences, or a user's current location) do so, or an opportunity to control whether or how to receive content from the content item selection system that may be more relevant to the user. In addition, certain data may be treated in one or more ways before it is stored or used by the content item selection system, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content item selection system.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for display with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain web pages over others. Accordingly, auction bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots in which one or more selected and served third-party content items may be displayed. The code (e.g., JavaScript®, HTML, etc.) defining a content item slot for a web page or other resource may include instructions to request one or more third-party content items from the content item selection system to be displayed with the web page. In some implementations, several third-party content items may be served as link units in a content item slot.

A link unit is a word or set of words (e.g., keywords) that link to another web page, such as a landing page, that can have several third-party content items related to the word or set of words of the link unit. For example, a link unit of "cheese" may be displayed and, when selected by a user, the client device may be directed to a landing page having several third-party content items related to the word "cheese." Thus, third-party content providers may bid on link unit keywords to have third-party content items presented as part of the landing page when the link unit is selected. The link units that are shown for the resource are selected based on the relevance of the keywords of the link unit to the content of the resource as well as the relevance of the content items associated with the link unit to the content of the resource.

In some implementations, when the link unit is selected, content items are selected using only the keyword or words of the link unit as context. Thus, additional contextual data about the content of a resource is lost when a link unit is selected, thereby potentially resulting in the presentation of inapplicable content items. For example, if a client device requests a resource having content about cars, then keyword link units such as "auto insurance," "insurance," "car deal,"

and "auto care" may be selected to be displayed with the resource. Another client device that requests a resource having content about health care reform may have keyword link units such as "health care," "life insurance," and "insurance" selected to be displayed with the resource. If users of either of the client devices select the "insurance" keyword link unit, then the landing page may be populated with content items generally about "insurance" without the additional context. For example, content items that may be selected for a keyword link unit of "insurance" may include car insurance content items, real estate insurance content items, health insurance content items, renter's insurance content items, etc. Thus, several of the selected and served content items for the landing page may be inapplicable to one or both users of the client devices. That is, even though the real intent for a user of the first client device was for "auto insurance" and the real intent for a user of the second client device was for "health insurance" or "life insurance," the content items selected for the landing page may not reflect the context of the content of the original resource.

In some implementations, the content of the resource may be analyzed again during the selection of content items for the landing page to provide the missing contextual data to select and serve applicable content items. Such an analysis may duplicate the contextual analysis done to select of the link units that were presented with the resource. Accordingly, it may be useful to utilize the link units and/or data associated with the link units to be used as contextual data for selecting content items for the landing page without directly reanalyzing the content of the original resource. Such a system can provide the additional contextual information for selecting and serving content items for a landing page after selection of a link unit while preserving processing power and bandwidth.

In one implementation, an encoded signal about the original resource will be sent with the request for content items to populate the landing page in response to a selection of a keyword link unit. This implementation combines all the keyword link units presented with the resource, but provides different weights for the selected keyword link unit and the unselected keyword link units. The selected keyword link unit are assigned as part of a "contents" field and is assigned a first weight, such as 100. The unselected keyword link units are assigned as part of a "hints" field and are each assigned a second weight, such as 20 or any other value relative to the first weight of the selected keyword link unit. When a request for content items to populate the landing page is generated in response to a selection of a keyword link unit, the "contents" field and "hints" field for a content item request (such as a URL string with appended encoded data) are populated based on the selected and unselected keyword link units and the corresponding weights. A content item selection system receives the content item request with the encoded additional contextual data and utilizes the keyword link units and corresponding weights in the selection of content items. For example, the content item selection system may use the keywords of the link units and the weights during an auction of content items (e.g., by scoring the relevance of content items to the keywords based on the weights). The content item selection system serves the selected content items to populate a landing page to be displayed on a display of a client device.

Another implementation utilizes the original groupings of keywords parsed from the resource that was previously used to select the keyword link units for the resource. When link units are to be selected and served with a resource, the content item selection system receives data indicative of the content of the resource. The content item selection system parses the data to find keywords of the content of the resource. The content item selection system semantically matches and ranks the parsed keywords with large sets of stored keywords. The scored keywords are grouped and sorted based on topics. The top ranked keywords of the highest scored groups are selected to be displayed as keyword link units for the resource. For example, a "food recipes" keyword may be selected from a group of keywords of "healthy food recipes," "food recipes," "organic food," "instant food recipes," etc. In the current implementation, each of the selected keyword link units to be displayed and the group for the selected keyword link unit are associated with a token (e.g., a unique identifier). The token for the keyword link unit is sent with the data for the keyword link unit to the client device. When a displayed keyword link unit is selected, the associated token is passed back to the content item selection system to retrieve the original group of keywords. The content item selection system may then use the original group of keywords as contextual data for selecting content items to be presented with the landing page. In some implementations, weights may be assigned to one or more of the keywords of the group. For example, 100 for the selected key word and 20 for the other keywords of the group. In some other implementations, a predetermined number of keywords of the group (e.g., top 20 keywords), including the selected keyword or words, may be weighted instead of all the keywords in the group. In some implementations, the weights may be linear (e.g., 100, 99, 98, 97, etc.). In still other implementations, the weights may be the original scores generated for the keywords when the group of keywords was generated (e.g., 100 through 1). The content item selection system may use the keywords of the group and, in some instances, the weights during an auction of content items (e.g., by scoring the relevance of content items to the keywords based on the weights). The content item selection system serves the selected content items to populate the landing page to be displayed on a display of a client device.

While the foregoing has provided an overview of implementations for a content item selection system that utilizes contextual data in the selection and serving of third-party content items after the selection of a link unit, more specific examples and systems to implement such a system will now be described.

FIG. 1 is a block diagram of an example system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can include at least one data processing system or processing module, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processing module may process instructions and output data to effect presentation of one or more content items to the resource server 104 and/or the client device 110. In addition to the processing circuit, the content item selection system 108 may include one or more databases configured to store data. The content item selection system 108 may include an interface, such as a communications module, configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®.

The client device 110 can execute a software application (e.g., a web browser or other application) to retrieve content from other computing devices over network 106. Such an application may be configured to retrieve first-party content, such as a resource, from a resource server 104. In some cases, an application running on the client device 110 may itself be first-party content (e.g., a game, a media player, etc.). In one example, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more data processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may be a combination (hybrid) of the formats. The content items may be banner content items, interstitial content items, pop-up content items, rich media content items, hybrid content items, etc. The content items may include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource, such as in a content item slot of the resource. The received request may be received from a resource server 104, a client device 110, and/or any other computing device. The resource may include a content tag that may be implemented using a client-side scripting language, such as JavaScript®. For example, the content tag may be of the form:

```
<script type= 'text/javascript'>
AdNetwork_RetrieveAd("argument")
</script>
``` where AdNetwork_RetrieveAd is a script function that causes the client device 110 to send a content item request to the content item selection server 108. The argument of the script function may include additional information, such as client device information, resource information, a quantity of content items, a format for the content items, a search query string, keywords of the search query string, information related to the query (e.g., geographic location information and/or temporal information), contextual data, etc.

The resource server 104 may be owned or operated by a first-party content provider that may include instructions for the content item selection system 108 to provide third-party content items with one or more resources of the first-party content provider on the resource server 104. In one implementation, the resource may include a web page. The client device 110 may be a computing device operated by a user (represented by a device identifier), which, when accessing a resource of the resource server 104, can make a request to the content item selection system 108 for content items to be presented with the resource, for instance. In some implementations, the request may be for one or more keyword link units (e.g., text of keywords that link to a landing page with additional third-party content items).

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may be presented with the search results in a content item slot of the search result web page. Accordingly, the resource server 104 and/or the client device 110 may request one or more content items from the content item selection system 108 to be presented in the content item slot of the search result web page. In some implementations, a delineation may be made between the search results and the third-party content items to avert confusion. In some implementations, the request may be for one or more keyword link units (e.g., text of keywords that link to a landing page with additional third-party content items).

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for specific keyword link units. Accordingly, when the keyword link unit is selected by a user of a client device, the third-party content item may be included in a set of third-party content items to be selected via an auction performed by the content item selection system 108. The third-party content provider may set a single bid value for several content items, set bid values for subsets of content items, and/or set bid values for each content item.

Figure 2:
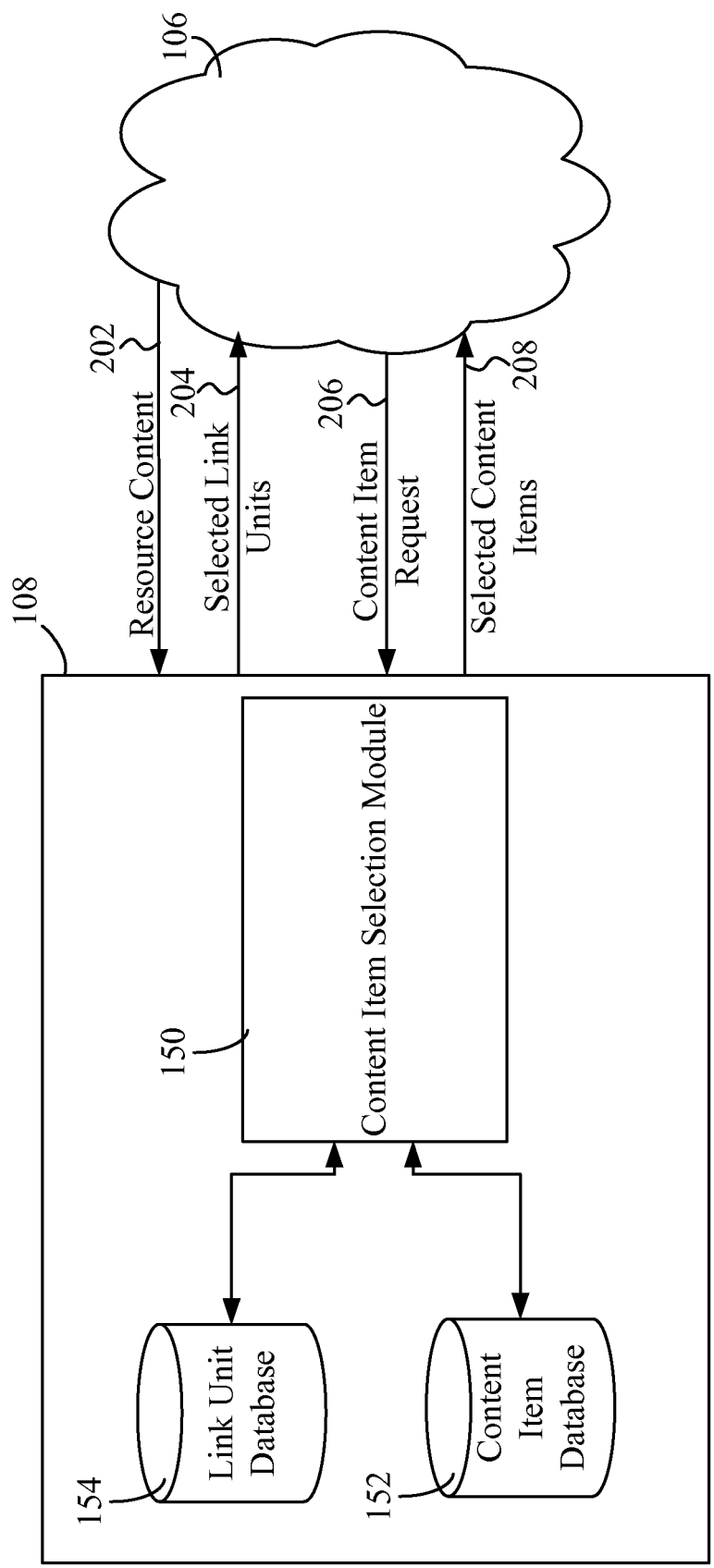
FIG. 2 is an overview illustration of an example content item selection system.

FIG. 2 depicts the content item selection system 108 of FIG. 1 showing additional components. The content item selection system 108 is in communication with the network 106 such that the content item selection system 108 may send and receive data from other computing devices in communication with the network 106. As noted above, the other devices may include the client device 110, third-party content server 102, resource server 104, etc. The content item selection system 108 of the present example includes a content item selection module 150, a content item database 152, and a link unit database 154.

In one aspect, the content item selection module 150 is configured to receive data indicative of the content of a resource 202 via the network 106. The content item selection module 150 may receive the data indicative of the content of the resource from a client device, such as client device 110, or from a resource server, such as resource server 104. The data indicative of the content of the resource 202 may be all of the data of the resource or a subset of the content of the resource, such as only the visible textual content of the resource.

The content item selection module 150 parses the received data to identify a set of keywords from the received data. The content item selection module 150 may identify and remove stop words, such as "a," "the," "and," etc. The content item selection module 150 groups the keywords into groups based on keywords pertaining to a similar topic. For example, if the keywords "food," "food recipes," "healthy food," "organic food," "instant food recipes," "kitchen," "bowl," "oven," and "baking pan" are parsed from the received data indicative of the content of a resource, then the content item selection module 150 may group the keywords "food," "food recipes," "healthy food," "organic food," and "instant food recipes" together as related to the topic of food and group the keywords "kitchen," "bowl," "oven," and "baking pan" as related to the topic of kitchen items. Additional similar keywords may be added to the groups, such as by semantic matching. The keywords of the groups may be ranked or scored such that the keywords of each group that appear most frequently in the content of the resource or are closely related to the keywords that appear most frequently receive a higher rank or score while keywords that appear less frequently in the content of the resource or are closely related to the keywords that appear less frequently receive a lower rank or score.

The content item selection module 150 selects keyword link units based on the top keyword from each of the groups of keywords. For example, if a content item slot of a resource can fit four keyword link units, then the content item selection module 150 selects four keyword link units based on the top keyword for the four most relevant groups to the content of the resource. In some instances, the top keyword of the group may be the keyword link unit. In other instances, an alternative keyword link unit may be selected from a link unit database 154 based on the top keyword of the group. The content item selection module 150 sends the selected keyword link units 204 via the network 106 to be presented with the resource, such as that shown in FIG. 3 described herein.

When a keyword link unit is selected, such as by a user of a client device clicking on the selected link unit, the client device may be directed to a landing page and a content item request may be sent 206 to the content item selection module 150. As will be discussed in greater detail below, the content item request may include contextual data with the content item request to be used by the content item selection module 150 during the selection of content items to populate the landing page.

The content item selection module 150 receives the content item request 206 and selects third-party content items. In some implementations the third-party content items may be stored in a content item database 152. In other implementations, the third-party content items may be retrieved from third-party content providers, such as third-party content server 102 of FIG. 1. The content item selection module 150 is configured to perform an auction among third-party content providers. For example, the content item selection module 150 may conduct a real-time auction among third-party content providers to determine which third-party content item is to be shown as part of the landing page. Bids may be specified by the third-party content providers or may be generated automatically on behalf of the providers to achieve a stated goal, in various implementations. For example, the content item selection module 150 may include a bidding utility that generates bids automatically (e.g., without requiring further input from a provider) based on a selected bidding strategy. The bidding strategy may be based on one or more goals of the third-party content provider, such as maximizing the number of times the content is displayed, the number of times the content is clicked by users, the number of conversions (e.g., whenever a user clicks on the content, gets redirected to a website of the provider, and performs a desired action such as making a purchase, signing up for a contact list, downloading software, etc.), a specified target bid amount, a specified budget allocation, combinations thereof, or the like.

In some implementations, the content item selection module 150 may use a quality score to determine which third-party content items are selected for populating the landing page. In general, a quality score refers to any metric that quantifies how relevant a third-party content item is to the content item request. For example, a quality score may be a predicted likelihood of a user clicking on the third-party content item, if selected by the content item selection module 150. A quality score may also be based on the contextual data received with the content item request. As will be described in greater detail below, in one implementations the contextual data may include the selected keyword link unit, a weight for the selected keyword link unit, one or more unselected keyword link units, and weights associated with the unselected keyword link units. In another implementation, the contextual data may include a unique token such that the content item selection module 150 may identify the group of keywords from which the selected keyword link unit was chosen. The group of keywords may be used as contextual data. The contextual data is used to determine a quality score for one or more third-party content items based on the relevance of the third-party content item to the contextual data. Thus, content items that are more relevant, based in part on the contextual data, may receive a higher score while content items that are less relevant, based in part on the contextual data, may receive a lower score.

The quality score may be used by the content item selection module 150, either alone or in conjunction with auction bids, to determine which third-party content items are selected to populate the landing page. In some implementations, the quality score may be combined with a third-party content provider's auction bid to determine a final value for the third-party content item. Thus, a third-party content item having the highest auction bid may not be guaranteed to be selected by the content item selection module 150.

Once the content items are selected by the content item selection module 150, the content item selection module 150 may transmit data to effect presentation of the selected third-party content items 208 via the network 106. The data may be transmitted with or as a part of the data to effect presentation of the landing page on a display of a client device.

Figure 3:
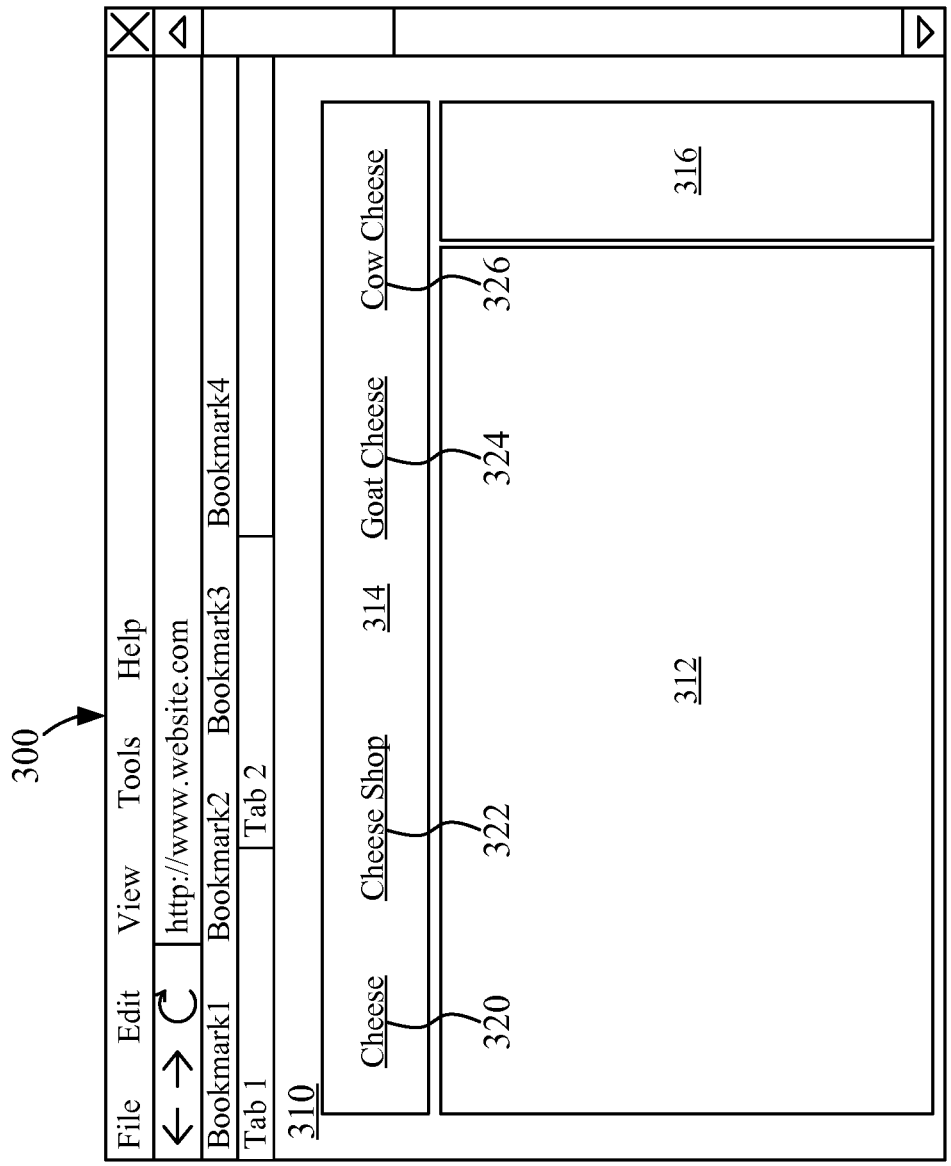
FIG. 3 is an overview illustration of an example resource having several link units.

FIG. 3 depicts an example of a web browser 300 depicting an example resource 310. In the present example, the resource 310 includes first-party content 312, a first content item slot 314, and a second content item slot 316. The first-party content 312 includes the content that is the subject of the resource. For example, a food blog resource may have entries for the first-party content 312 that relate to recipes, reviews of recipes, reviews of restaurants, etc. The data indicative of the first-party content 312 is transmitted to the content item selection module 150 of the content item selection system 108 to select keyword link units to be presented with the resource 310. In some implementations, the data indicative of the first-party content 312 may also be used to select third-party content items to be presented with the resource 310, such as in second content item slot 316.

The first content item slot 314 and the second content item slot 316 may include a content tag that may be implemented using a client-side scripting language, such as JavaScript®. For example, the content tag may be of the form:

```
<script type= 'text/javascript'>
AdNetwork_RetrieveAd("argument")
</script>
``` where AdNetwork_RetrieveAd is a script function that causes the client device executing the web browser 300 to send a content item request to the content item selection server. The argument of the script function may include additional information, such as client device information, resource information, a quantity of content items, a format for the content items, a search query string, keywords of the search query string, information related to the query (e.g., geographic location information and/or temporal information), contextual data, etc.

The first content item slot 314 includes four keyword link units 320, 322, 324, 326. As shown in FIG. 3, the first keyword link unit 320 includes the word "Cheese," the second keyword link unit 322 includes the words "Cheese Shop," the third keyword link unit 324 includes the words "Goat Cheese," and the fourth keyword link unit 326 includes the words "Cow Cheese." Such keyword link units are selected based on an analysis of the data indicative of the first-party content 312 of the resource 310. When a keyword link unit is selected, the web browser 300 of the client device is directed to a landing page, as shown in FIG. 4.

Figure 4:
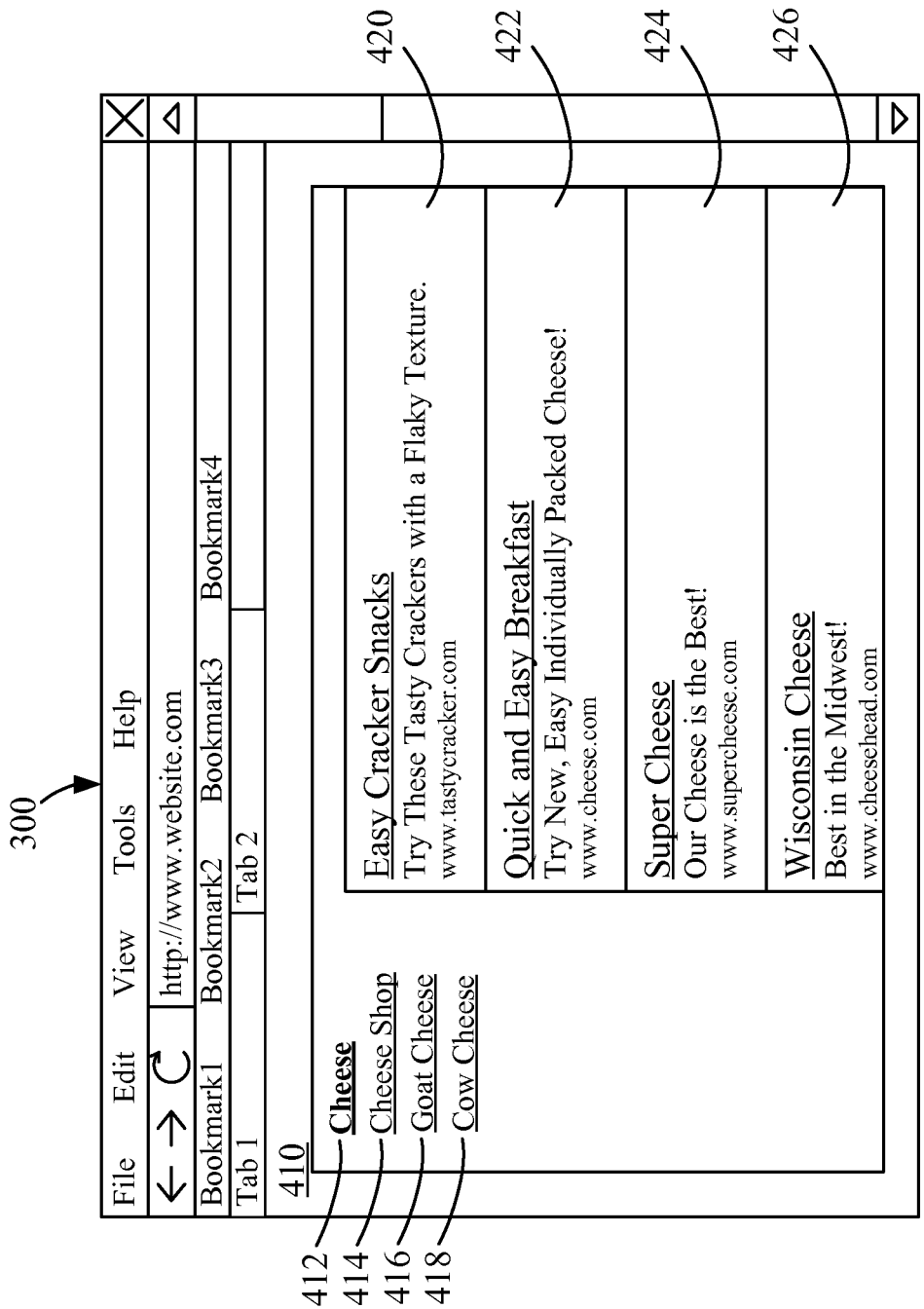
FIG. 4 is an overview illustration of a landing page having several content items associated with a selected link unit.

FIG. 4 depicts the web browser 300 showing an example landing page 410. The landing page 410 includes a list of the four keyword link units 412, 414, 416, 418 that were presented with the resource 310. In the present example, the first keyword link unit 412 for "Cheese," is highlighted as the first keyword link unit 412 was the keyword link unit selected by a user from the resource 310. The landing page 410 is populated with several third-party content items 420, 422, 424, 426 that were selected and served by the content item selection module 150 of the content item selection system 108 based, at least in part, on the contextual data received by the content item selection module 150, as will be described in greater detail below.

In some implementations, third-party content items 420, 422, 424, 426 are selected and served based only on the selection of link unit 412. In the present example, the third-party content items 420, 422, 424, 426 are selected and served with the landing page 410 based on an association with link unit 412 and the contextual information provided by link units 414, 416, 418. By way of example, if a first third-party content provider provides a content item, for example, A1, to be served based on keywords A11, A12, A13, a second third-party content provider provides a content item, A2, to be served based on keywords A11, A13, A15, a third third-party content provider provides a content item, A3, to be selected and served based on key words A15, A19, A29, then, if keyword link units associated with keywords A11, A13 are selected for serving with a resource, such as resource 310, and a link unit associated with keyword A11 is selected, then the association with the keyword A13 may also be utilized in selecting third-party content items for the landing page 410. In the above example, content items A1 and A2 will be selected for a set of content items for which an auction of content items will be performed for presentation on the landing page 410.

Figure 5:
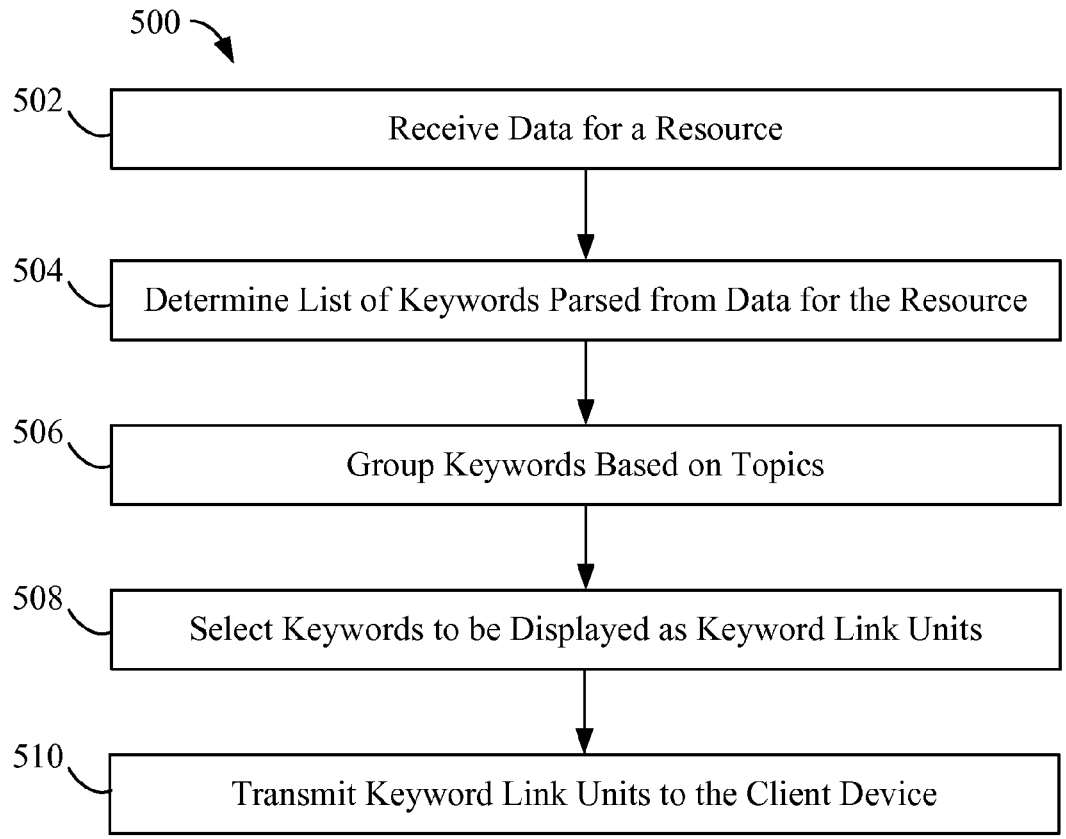
FIG. 5 is an example flow diagram for determining a set of keyword link units.

FIG. 5 depicts an example process 500 that may be performed by the content item selection module 150 of the content item selection system 108 for selecting keyword link units. Data indicative of the content of a resource, such as data indicative of first-party content 312 of resource 310, is received by the content item selection module 150 (block 502). In some implementations, the data indicative of the content of the resource may be received by the content item selection system 108 directly from the resource server hosting the resource (e.g., a website server) in response to a client device requesting the resource from the resource server. In other implementations, the data indicative of the content of the resource may be receive by the content item selection system 108 from the client device. In some implementations the data indicative of the content of the resource may be included as part of a content item request or transmitted substantially concurrently with the content item request.

A list of keywords are determined based on a parsing of the received data for the resource (block 504). In an implementation, the content item selection module 150 may identify textual content contained in the data. For instance, the content item selection module 150 may detect Hypertext Markup Language (HTML) tags identifying textual portions of the data. The content item selection module 150 may pre-process the textual portions of the received data to remove stop words (e.g., "a," "the," "and," etc.). The content item selection module 150 may then determine a list of keywords based on the resulting parsed textual data. For example, the phrase "The food at The Cheese Place was excellent" may be reduced to a list of keywords including "food," "Cheese," "Place," "Cheese Place," and "excellent." In some implementations a lexicon analysis will be performed on the textual data. For example, the sentence "I just bought a new car insurance," will be segmented into "bought" "car insurance," but not "new car" "insurance" because the lexicon analysis is based on semantic analysis and natural language processing and may also supplemented by word analysis. For example, the keywords a third-party content item provider may bid on may be used to determine the word analysis.

The keywords are then grouped based on topics (block 506). In an implementation, the content item selection module 150 may group and sort the keywords of the determined list into groups based on word clusters, semantic matching, etc. For example, if the list of keywords include "food," "food recipes," healthy food," "organic food," "instant food recipes," "kitchen," "bowl," "oven," and "baking pan," then the content item selection module 150 may group the keywords "food," "food recipes," healthy food," "organic food," and "instant food recipes" together as related to the topic of food and group the keywords "kitchen," "bowl," "oven," and "baking pan" as related to the topic of kitchen items. For example, in some implementations a mutual similarity score may be generated for each of the keywords relative to the other keywords. That is, a numerical value for the "distance" between the keywords may be determined. For example, the words "food" and "food recipes" may have a mutual similarity score of 0.8, the words "game" and "games" may have a mutual similarity score of 0.95, and the words "healthy food" and "kitchen appliance" may have a mutual similarity score of 0.0. Thus, for each word a similarity score may be computed for each other word of the list of keywords and the scores may be sorted by descending order. The content item selection module 150 may utilize a threshold value, such as 0.8, to determine the keywords to be grouped together. That is, keywords may be grouped together for pairs of words that have a similarity score above the threshold value. Once a set of keywords are grouped together based on the threshold similarity value, a next set of keywords may be grouped together using the threshold value. The process may continue until all the keywords are grouped together into groups or no keywords can be grouped (e.g. the mutual similarity score does not exceed the threshold value).

Keywords are selected to be displayed as keyword link units from the groups of keywords (block 508). In some implementations, the groups may be ranked based on the relevance of the topic to the content of the resource. For example, groups may be ranked based on the number of keywords each group contains from the parsed content of the resource. That is, groups with more keywords may be for a topic that is more relevant to the content of the resource than groups with less keywords. In addition to ranking groups, the content item selection module 150 may rank keywords within each group. For instance, the content item selection module 150 may rank the keywords within each group based on the frequency that each keyword appears in the parsed content of the resource. The content item selection module 150 selects the top keyword from each of the top groups for a number of keyword link units to be presented with the resource. In the example shown in FIG. 3, four keyword link units are to be presented with the resource, so the highest ranked keyword of the four highest ranked groups of keywords are selected to be presented as keyword link units. In some implementations, other keywords other than the most frequent keyword may be selected as the keyword link unit. For instance, if a group of keywords from the parsed content of the resource is identified as related to the topic of food, then the keyword "food" may be used as the keyword link unit even if the term does not appear frequently or at all in the parsed content of the resource.

In other implementations, the keywords may initially be grouped together, such as that described in reference to block 506. The keywords may then be sorted based on a performance score. For example, the performance score may include a predicted click through rate (pCTR), a predicted conversion rate (pCVR), or another performance score. Using the groups sorted by performance score, the groups (e.g., a set of keywords), may be sorted based upon the highest score of each group. Using the sorted groups, the top word from each group may be selected to be a keyword link unit up to a number of keyword link units to be presented. For example, if a client device requests four keyword link units, then the top four keywords from the top four groups may be selected to be served as keyword link units. If, in some implementations, there are insufficient groups from which to select keyword link units (e.g., the client device requests four keyword link units and only three groups are generated), then the second highest keyword of each group is compared to determine the highest scoring keyword to be displayed. For example, in the example of three groups, the top three keywords are selected as keyword link units and the second highest scoring keyword of each group is compared. The highest scoring keyword of the second tier is selected as the fourth keyword link unit.

The keyword link units are then transmitted to a client device to be presented with the resource (block 510). In some instances, data to effect presentation of the selected keyword link units is transmitted in response to a content item request. The transmitted data may include the text of the keyword, such as "Cheese," a hyperlink to a landing page if the keyword link unit is selected, and a validation token. Examples of such keyword link units are shown as keyword link units 320, 322, 324, 326 of FIG. 3. The link to the landing page may direct the web browser of a client device, upon selecting the keyword link unit, to a template landing page that will be populated with third-party content items and other data based on the selected keyword link unit. An example of such a landing page is shown as landing page 410 of FIG. 4. In some implementations, the transmitted data may also include encoded information for the contextual information for each keyword. That is, the encoded information may include data indicative of similar keywords from the group from which the link unit was selected. In some implementations, the encoded contextual information may be truncated, such as truncated to the top ten keywords from the same group based on the similarity score and/or performance score. In some implementations the encoded information may be encoded as part of the validation token.

Figure 6:
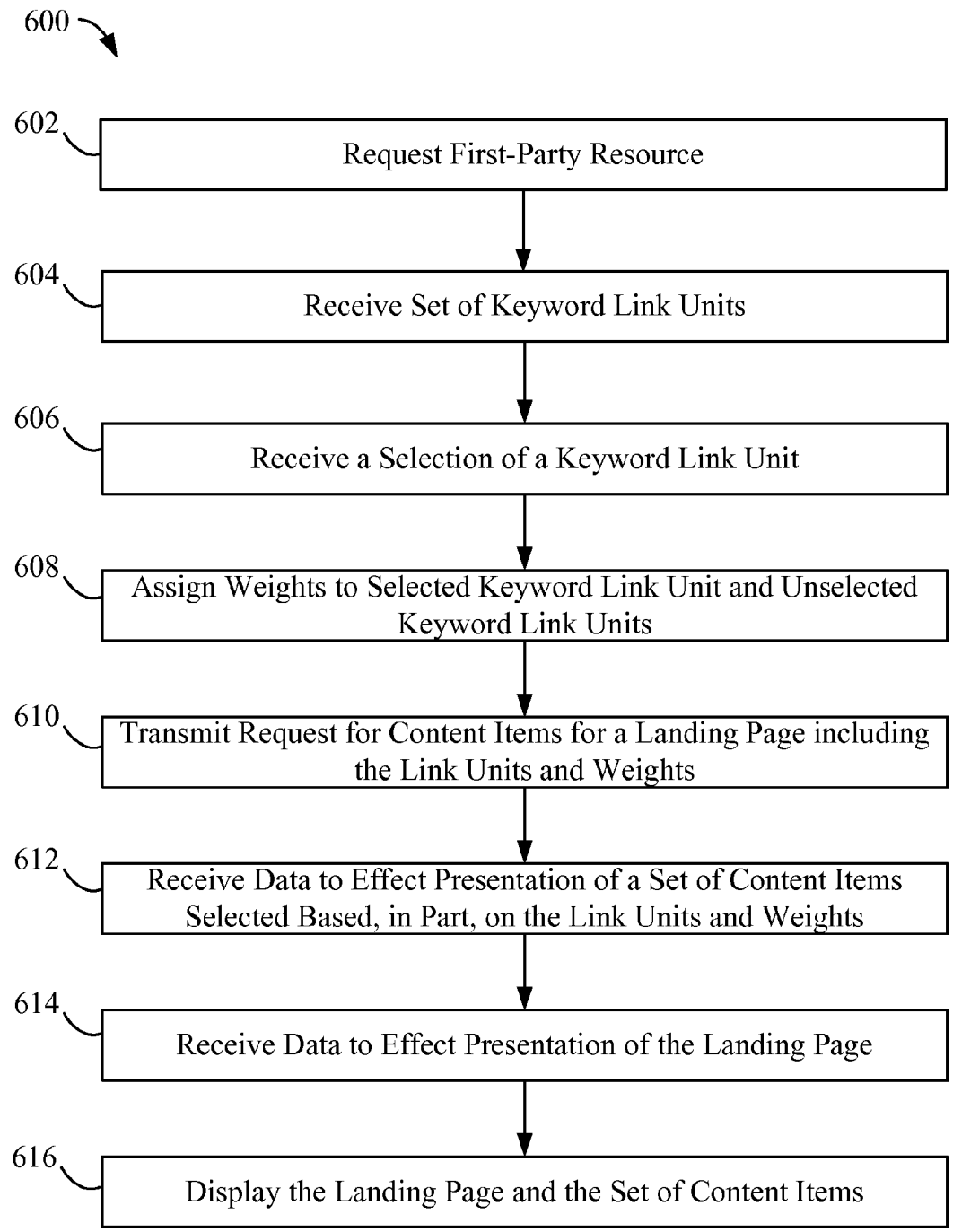
FIG. 6 is an example flow diagram for providing contextual data for selecting and serving content items for a landing page by weighting link units.

FIG. 6 depicts an example process 600 that may be executed by the client device. The client device may request a first-party resource (block 602). For example, the first-party resource may be a webpage, a web application, a document, etc. When the client device requests the first-party resource, the process 500 of FIG. 5 may be performed by the content item selection module 150 to select and serve keyword link units to be presented with the first-party resource. The client device receives the set of keyword link units, either from the content item selection system 108 or from a resource server via the network (block 604).

A user viewing the first-party resource and the keyword link units may select, such as by clicking using an input device, a keyword link unit. The client device receives the selection of a keyword link unit (block 606). The selection of the keyword link unit may cause the client device to perform several operations. For example, the keyword link unit may include a hyperlink that causes a web browser executing on the client device to request a landing page that will be populated with several third-party content items, as described in greater detail herein. The selection of the keyword link unit may also cause the client device to transmit a content item request to the content item selection system 108 to request the third-party content items to populate the landing page. The client device may include contextual data as part of the content item request to provide additional data for the content item selection system 108 to select applicable third-party content items. In some implementations the contextual data may be encoded and included as part of a token received by the content item selection system 108 from the client device as part of the selected hyperlink URL.

In the present example, the contextual data includes the keyword link units and weights assigned to the keyword link units. In response to the selection of a keyword link unit of the set of keyword link units, the client device may assign weights to the selected keyword link unit and the unselected keyword link units (block 608). A first weight can be assigned to the selected keyword link unit and a second weight can be assigned to one or more of the unselected keyword link units. The weights and the associated keyword link units may be used by the content item selection module 150 of the content item selection system 108 when ranking or scoring third-party content items for selection and serving with the landing page. For instance, third-party content items that are related to both the selected keyword link unit and the unselected keyword link units may have higher scores, based on the weighting, than scores for third-party content items that are only related to the selected keyword link unit. That is, if a selected keyword link unit is "insurance" and the unselected keyword link units are "cars" and "car insurance," then a first third-party content item for car insurance may have a higher score, since it is also related to the unselected keyword link units, than a third-party content item for home owners insurance. Thus, the unselected keyword link units and the assigned weights may provide additional contextual data to be used by the content item selection module 150 to select applicable third-party content items.

The first weight assigned to the selected keyword link unit can be greater than the second weight assigned to one or more of the unselected keyword link units. In some implementations, the first weight can be five times greater than the second weight, such as a first weight of 100 for the selected keyword link unit and a second weight of 20 for the one or more unselected keyword link units. In some implementations, the client device may identify the selected keyword link unit and the unselected keyword link units and the content item selection module 150 may assign the weights to the selected keyword link unit and the unselected keyword link units.

The client device may transmit to the content item selection system 108, via the network, the request for content items for the landing page that includes the selected keyword link unit (or an identifier for the selected keyword link unit), the first assigned weight, one or more unselected keyword link units (or identifiers for the unselected keyword link units), and the second assigned weight (block 610). In some implementations, the first weight and the second weight may be included as part of the argument of the content item request sent to the content item selection system 108. In other implementations, the request for content items to populate a content item slot of the landing page may be a URL having a first identifier for the selected keyword link unit, the assigned first weight for the selected keyword link unit, a second identifier for an unselected keyword link unit, and the assigned second weight for the unselected keyword link unit. The content item selection module 150 of the content item selection system 108 selects third-party content items based, at least in part, on the selected keyword link unit, the first weight, the one or more unselected keyword link units, and the second weight, as will be described in reference to FIG. 7.

The client device receives data to effect presentation of a set of selected third-party content items based, in part, on the link units and the assigned weights (block 612). The data to effect presentation of the set of selected third-party content items may include text, images, code, etc. The client device receives data to effect presentation of the landing page (block 614). In some implementations, the data to effect presentation of the set of third-party content items and the landing page may be sent to the client device concurrently. In other implementations, the content item selection system 108 and include the data to effect presentation of the set of third-party content items in the data to effect presentation of the landing page. The client device, using the data to effect presentation of the set of third-party content items and the landing page, displays the landing page with the third-party content items on a display of the client device (block 616).

Figure 7:
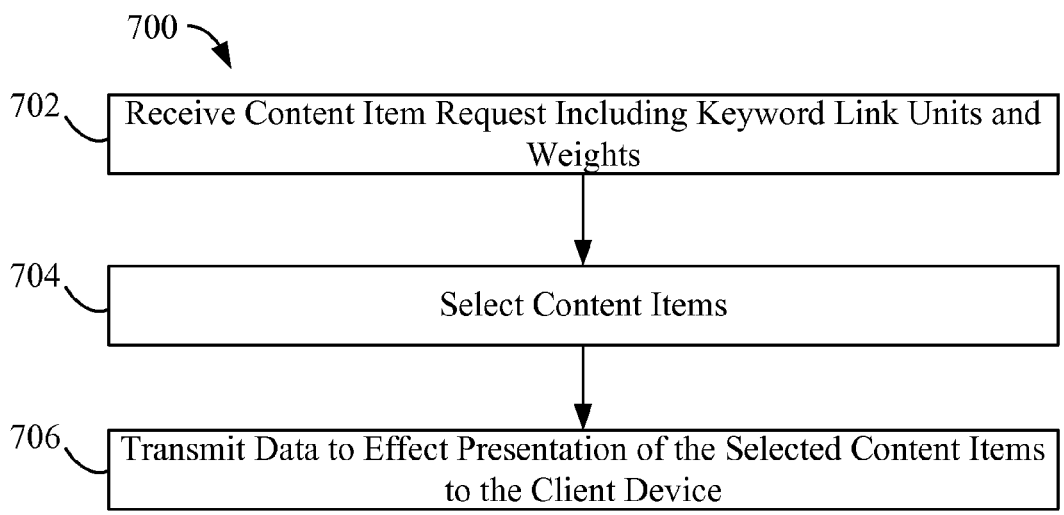
FIG. 7 is an example flow diagram for selecting and serving content items based on weights for the keyword link units.

FIG. 7 depicts an example process 700 for the content item selection module 150 to select and serve third-party content items using the contextual data from the client device. The content item selection module 150 receives a content item request that includes the selected keyword link unit, the first weight, the one or more unselected keyword link units, and the second weight (block 702). Using the selected keyword link unit, the first weight, the one or more unselected keyword link units, and the second weight, the content item selection module 150 selects third-party content items to populate the landing page (block 704). In an implementation, the content item selection module 150 performs an auction for a set of third-party content items to be selected. The content item selection module 150 may conduct a real-time auction among third-party content providers to determine which third-party content items are to be shown as part of the landing page. The content item selection module 150 uses a quality score to determine which third-party content items are selected for populating the landing page. In the present example, the quality score is based, at least in part, on the selected keyword link unit, the first weight, the one or more unselected keyword link units, and the second weight. For example, the selected keyword link unit, the first weight, the one or more unselected keyword link units, and the second weight may be used by the content item selection module 150 to determine the relevance of each third-party content item in the auction. That is, third-party content items that are more relevant to the selected keyword link unit and the unselected keyword link units will receive a higher score. The first weight and the second weight are used such that third-party content items that are related to the selected keyword link unit will receive a higher score than third-party content items related only to the unselected keyword link units.

The resulting quality scores for the third-party content items in the auction may be used by the content item selection module 150, either alone or in conjunction with other data, such as auction bids, to determine which third-party content items are selected to populate the landing page. In some implementations, the quality score may be combined with a third-party content provider's auction bid to determine a final value for the third-party content item. Thus, a third-party content item having the highest auction bid may not be guaranteed to be selected by the content item selection module 150 if the quality score for the third-party content item is low.

After selecting one or more third-party content items to populate the landing page, the content item selection system transmits data to effect presentation of the selected third-party content items to the client device (block 706). The data may include text, images, code, etc. to effect presentation of the third-party content items.

Figure 8:
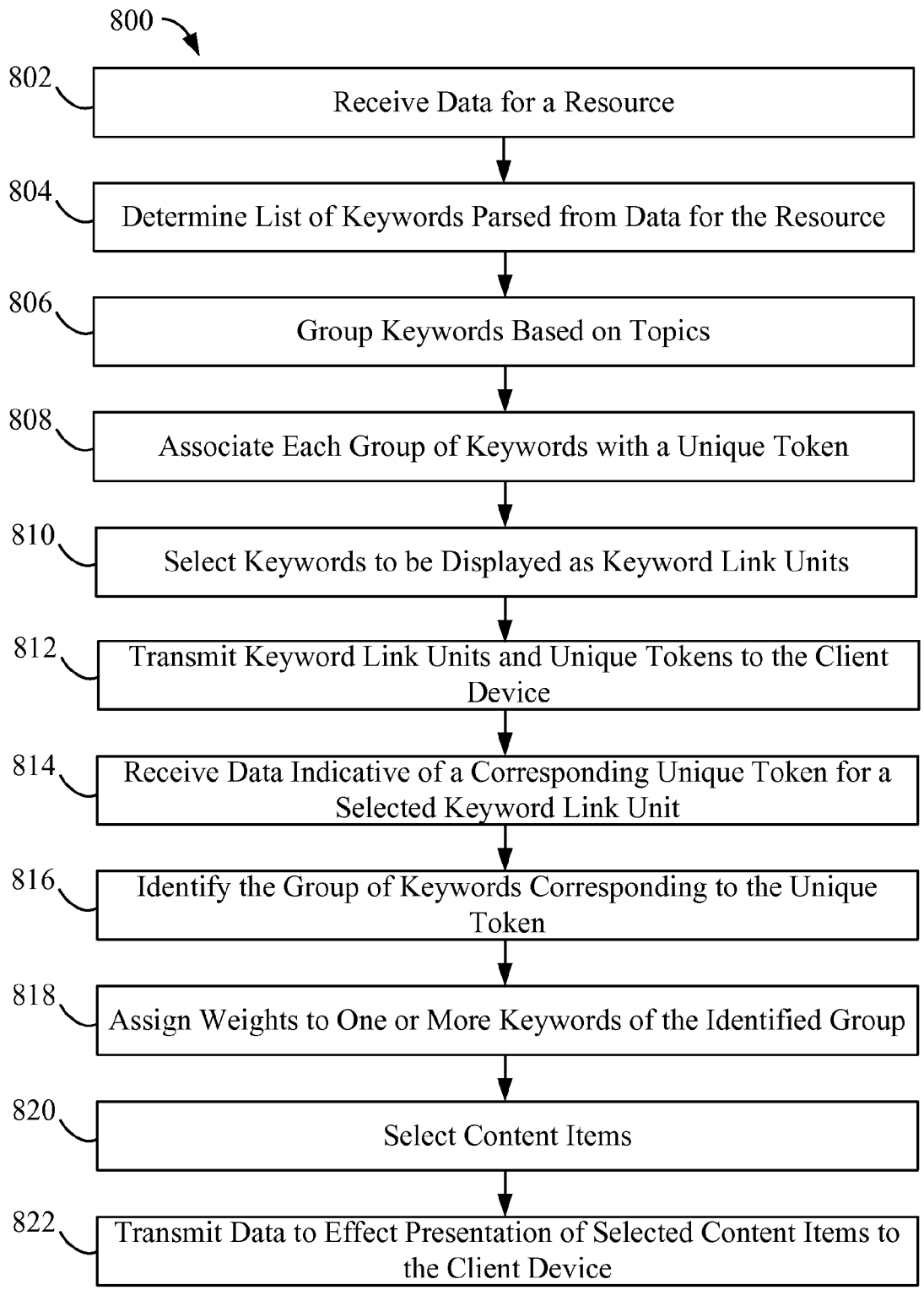
FIG. 8 is another example flow diagram for providing contextual data for selecting and serving content items for a landing page by weighting keywords of a keyword group.

FIG. 8 depicts an example process 800 for providing contextual data for selecting and serving content items for a landing page by weighting keywords of a keyword group. The process 800 includes receiving data for a resource (block 802). The received data may be data indicative of the content of a resource, such as data indicative of first-party content 312 of resource 310. In some implementations, the data indicative of the content of the resource may be received by the content item selection system 108 and/or the content item selection module 150 directly from the resource server hosting the resource (e.g., a website server) in response to a client device requesting the resource from the resource server. In other implementations, the data indicative of the content of the resource may be receive by the content item selection system 108 and/or the content item selection module 150 from the client device. In some implementations the data indicative of the content of the resource may be included as part of a content item request or transmitted substantially concurrently with the content item request.

A list of keywords are determined based on a parsing of the received data for the resource (block 804). In an implementation, the content item selection module 150 may identify textual content contained in the data. For instance, the content item selection module 150 may detect HTML tags identifying textual portions of the data. The content item selection module 150 may pre-process the textual portions of the received data to remove stop words (e.g., "a," "the," "and," etc.). The content item selection module 150 may then determine a list of keywords based on the resulting parsed textual data. For example, the phrase "The food at The Cheese Place was excellent" may be reduced to a list of keywords including "food," "Cheese," "Place," "Cheese Place," and "excellent."

The keywords are then grouped based on topics (block 806). In an implementation, the content item selection module 150 may group and sort the keywords of the determined list into groups based on word clusters, semantic matching, etc. For example, if the list of keywords include "food," "food recipes," healthy food," "organic food," "instant food recipes," "kitchen," "bowl," "oven," and "baking pan," then the content item selection module 150 may group the keywords "food," "food recipes," healthy food," "organic food," and "instant food recipes" together as related to the topic of food and group the keywords "kitchen," "bowl," "oven," and "baking pan" as related to the topic of kitchen items.

Each group of keywords is associated with a unique token (block 808). In some implementations, the token may simply be a random or pseudo-random numeric or alphanumeric string that is unique to the group of keywords. The unique token or an identifier for the unique token may be separate from the data for the group of keywords or the unique token may be included in the data for the group of keywords, such as in metadata for the group of keywords. In some implementations, the unique token may be reused after a predetermined period of time, such as daily, weekly, monthly, etc. and/or reused after the process is completed. For example, a unique token may be used for a set of groups of keywords and, when a keyword link unit is selected and/or no keyword link unit is selected, the unique token may be used for other groups. In some implementations, blocks 802-808 may be performed by another module or another system, and the process 800 may begin by receiving a set of groups of keywords associated with the resource and each group being associated with a unique token.

Keywords are selected to be displayed as keyword link units from the groups of keywords (block 810). In some implementations, the groups may be ranked based on the relevance of the topic to the content of the resource. For example, groups may be ranked based on the number of keywords each group contains from the parsed content of the resource. That is, groups with more keywords may be for a topic that is more relevant to the content of the resource than groups with less keywords. In addition to ranking groups, the content item selection module 150 may rank keywords within each group. For instance, the content item selection module 150 may rank the keywords within each group based on the frequency that each keyword appears in the parsed content of the resource. The content item selection module 150 selects the top keyword from each of the top groups for a number of keyword link units to be presented with the resource. In the example shown in FIG. 3, four keyword link units are to be presented with the resource, so the highest ranked keyword of the four highest ranked groups of keywords are selected to be presented as keyword link units. In some implementations, other keywords other than the most frequent keyword may be selected as the keyword link unit. For instance, if a group of keywords from the parsed content of the resource is identified as related to the topic of food, then the keyword "food" may be used as the keyword link unit even if the term does not appear frequently or at all in the parsed content of the resource.

The keyword link units and corresponding unique tokens are transmitted to a client device to be presented with the resource (block 812). In some instances, data to effect presentation of the selected keyword link units is transmitted in response to a content item request. The transmitted data may include a the text of the keyword, such as "Cheese," a hyperlink to a landing page if the keyword link unit is selected, and the unique token corresponding to the group of keywords from which the keyword link unit was selected (block 810). Examples of keyword link units are shown as keyword link units 320, 322, 324, 326 of FIG. 3. The link to the landing page may direct the web browser of a client device, upon selecting the keyword link unit, to a template landing page that will be populated with third-party content items and other data based on the selected keyword link unit. An example of such a landing page is shown as landing page 410 of FIG. 4. The unique token may be included in hyperlink to the landing page, such as in a string appended or included in the hyperlink.

When a keyword link unit is selected, data indicative of the corresponding unique token is received for the selected keyword link unit from the client device (block 814). In an implementation, the unique token may be transmitted to the content item selection system 108 as part of a content item request to populate the landing page after selection of the keyword link unit. In other implementations, the unique token may be transmitted separately from the content item request.

The group of keywords corresponding to the unique token are identified (block 816). In some implementations, the identification may simply compare the received unique token to the unique tokens included or associated with the groups of keywords. Thus, the content item selection module 150 may utilize the unique token to retrieve the previously used group of keywords as contextual data in the selection of third-party content items.

Weights may be assigned to one or more of the keywords of the identified group (block 818). A first weight can be assigned to the keyword of the group corresponding to the keyword that was displayed as the selected keyword link unit and a second weight can be assigned to one or more of the other keywords of the identified group. The weights and the associated keywords from the identified group of keywords may be used by the content item selection module 150 of the content item selection system 108 when ranking or scoring third-party content items for selection and serving with the landing page. For instance, third-party content items that are related to both the keyword that was displayed as the selected keyword link unit and the other keywords of the identified group may have higher scores, based on the weighting, than scores for third-party content items that are only related to the keyword that was displayed as the selected keyword link unit. For example, if the keyword that was displayed as the selected keyword link unit is "insurance" and the other keywords of the identified group are "cars" and "car insurance," then a first third-party content item for car insurance may have a higher score, since it is also related to the other keywords of the identified group of keywords, than a third-party content item for home owners insurance. Thus, the other keywords in the identified group, based on the unique token, and the assigned weights may provide additional contextual data to be used by the content item selection module 150 to select applicable third-party content items.

The first weight assigned to the keyword that was displayed as the selected keyword link unit can be greater than a second weight assigned to one or more of the other keywords of the identified group. In some implementations, the first weight can be five times greater than the second weight, such as a first weight of 100 for the keyword that was displayed as the selected keyword link unit and a second weight of 20 for the one or more of the other keywords of the identified group. In some implementations, a predetermined number of keywords of the identified group of keywords (e.g., top 5, 10, 20, 50, 100 keywords) that is less than the total number of keywords in the identified group may be weighted instead of all the keywords in the identified group. In some other implementations, the weights may be linear (e.g., 100, 99, 98, 97, etc.), such as in the order of the keywords in the identified group. In still other implementations, the weights may be the scores generated for the keywords when the group of keywords was determined based on an analysis of the content of the resource (e.g., scores of 100, inclusive, to 1, inclusive).

Using the assigned weights for the one or more keywords of the identified group of keywords, third-party content items are selected to populate the landing page (block 820) such as by the content item selection module 150. In an implementation, the content item selection module 150 performs an auction for a set of third-party content items to be selected. The content item selection module 150 may conduct a real-time auction among third-party content providers to determine which third-party content items are to be shown as part of the landing page. The content item selection module 150 may use a quality score to determine which third-party content items are selected for populating the landing page. In the present example, the quality score is based, at least in part, on the one or more keywords and the corresponding weights assigned to the one or more keywords. For example, the one or more keywords and the corresponding weights may be used by the content item selection module 150 to determine the relevance of each third-party content item in the auction. The resulting quality scores for the third-party content items in the auction may be used by the content item selection module 150, either alone or in conjunction with other data, such as auction bids, to determine which third-party content items are selected to populate the landing page. In some implementations, the quality score may be combined with a third-party content provider's auction bid to determine a final value for the third-party content item. Thus, a third-party content item having the highest auction bid may not be guaranteed to be selected by the content item selection module 150 if the quality score for the third-party content item is low.

After selecting one or more third-party content items to populate the landing page, the content item selection system transmits data to effect presentation of the selected third-party content items to the client device (block 822). The data may include text, images, code, etc. to effect presentation of the third-party content items. In some implementations, the content item selection system may transmit data for the landing page to the client device that includes one or more content items slots to display the selected third-party content items.

Figure 9:
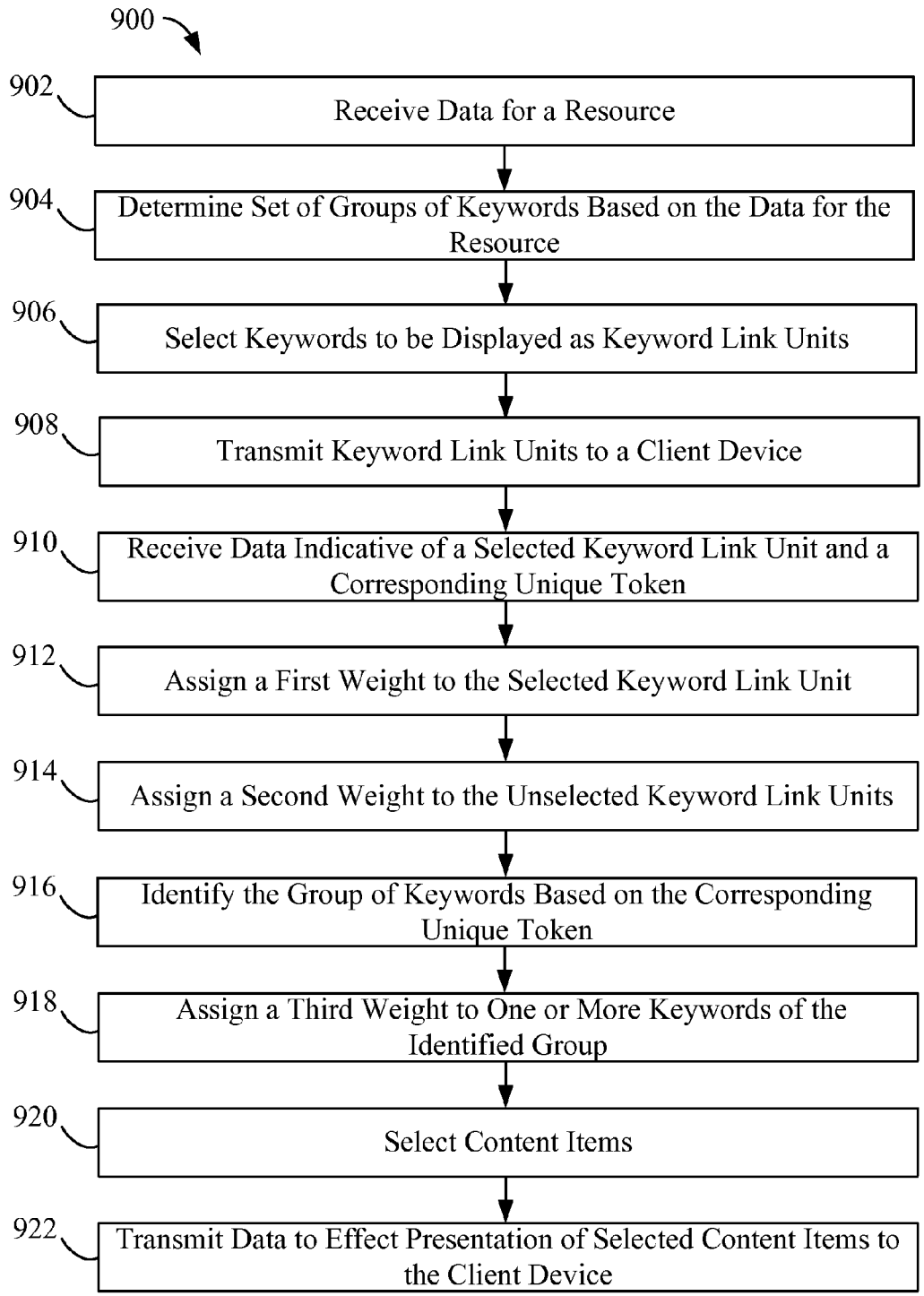
FIG. 9 is yet another example flow diagram for providing contextual data for selecting and serving content items for a landing page by weighting link units and keywords of a keyword group.

FIG. 9 depicts another example process 900 for providing contextual data for selecting and serving content items for a landing page by weighting link units and keywords of a keyword group. The process 900 includes receiving data for a resource (block 902). The received data may be data indicative of the content of a resource, such as data indicative of first-party content 312 of resource 310. In some implementations, the data indicative of the content of the resource may be received by the content item selection system 108 and/or the content item selection module 150 directly from the resource server hosting the resource (e.g., a website server) in response to a client device requesting the resource from the resource server. In other implementations, the data indicative of the content of the resource may be receive by the content item selection system 108 and/or the content item selection module 150 from the client device. In some implementations the data indicative of the content of the resource may be included as part of a content item request or transmitted substantially concurrently with the content item request.

A set of groups of keywords are determined based on the data for the resource (block 904). The set of groups may be determined in a similar manner to that described for process 500 by determining a list of keywords parsed from the data for the resource (block 504) and grouping the keywords into groups based on the keywords belonging to a similar topic (block 506). Each group of keywords may be associated with a unique token, such as in a similar manner to that described in process 800 in reference to block 808. In some implementations, the token may simply be a random or pseudo-random numeric or alphanumeric string that is unique to the group of keywords. The unique token or an identifier for the unique token may be separate from the data for the group of keywords or the unique token may be included in the data for the group of keywords, such as in metadata for the group of keywords. In some implementations, the unique token may be reused after a predetermined period of time, such as daily, weekly, monthly, etc. and/or reused after the process is completed. For example, a unique token may be used for a set of groups of keywords and, when a keyword link unit is selected and/or no keyword link unit is selected, the unique token may be used for other groups.

Keywords are selected to be displayed as keyword link units from the groups of keywords (block 906). In some implementations, the groups may be ranked based on the relevance to the content of the resource. For example, groups may be ranked based on the number of keywords each group contains from the parsed content of the resource. That is, groups with more keywords may be for a topic that is more relevant to the content of the resource than groups with less keywords. In addition to ranking groups, the content item selection module 150 may rank keywords within each group. For instance, the content item selection module 150 may rank the keywords within each group based on the frequency that each keyword appears in the parsed content of the resource. The content item selection module 150 selects the top keyword from each of the top groups for a number of keyword link units to be presented with the resource. In the example shown in FIG. 3, four keyword link units are to be presented with the resource, so the highest ranked keyword of the four highest ranked groups of keywords are selected to be presented as keyword link units. In some implementations, other keywords other than the most frequent keyword may be selected as the keyword link unit. For instance, if a group of keywords from the parsed content of the resource is identified as related to the topic of food, then the keyword "food" may be used as the keyword link unit even if the term does not appear frequently or at all in the parsed content of the resource.

The keyword link units are transmitted to a client device to be presented with the resource (block 908). In some instances, data to effect presentation of the selected keyword link units is transmitted in response to a content item request. The transmitted data may include a the text of the keyword, such as "Cheese," a hyperlink to a landing page if the keyword link unit is selected, and the unique token corresponding to the group of keywords from which the keyword link unit was selected. Examples of keyword link units are shown as keyword link units 320, 322, 324, 326 of FIG. 3. The link to the landing page may direct the web browser of a client device, upon selecting the keyword link unit, to a template landing page that will be populated with third-party content items and other data based on the selected keyword link unit. An example of such a landing page is shown as landing page 410 of FIG. 4. The unique token may be included in hyperlink to the landing page, such as in a string appended or included in the hyperlink.

When a keyword link unit is selected, data indicative of the selected keyword link unit and a corresponding unique token is received from the client device (block 910). The data indicative of the selected keyword link unit may include the keyword link unit itself, an identifier of the keyword link unit, or the keyword for the keyword link unit. In some implementations, data indicative of the unselected keyword link units may be received, such as the unselected keyword link units, identifiers for the unselected keyword link units, or the keywords for the unselected keyword link units. In other implementations, the content item selection module 150 and/or another module of the content item selection system 108 may temporarily store data indicative of the transmitted keyword link units such that the unselected keyword link units may be identified based on the data indicative of the transmitted keyword link units and the data indicative of the selected keyword link unit.

A first weight is assigned to the selected keyword link unit (block 912) and a second weight can be assigned to one or more unselected keyword link units (block 914). The first weight assigned to the selected keyword link unit can be greater than the second weight assigned to one or more of the unselected keyword link units. In some implementations, the first weight can be five times greater than the second weight, such as a first weight of 100 for the selected keyword link unit and a second weight of 20 for the one or more unselected keyword link units. In some implementations, the first weight and second weight may be previously assigned (such as by the client device) and received with the data indicative of the selected keyword link unit and the corresponding token (block 910). For example, the first weight and the second weight or weights may be included as part of the argument of a content item request sent to the content item selection system 108 that includes the data indicative of the selected keyword link unit and the corresponding token. In other implementations, the request for content items to populate a content item slot of the landing page may be a URL having a first identifier for the selected keyword link unit, the assigned first weight for the selected keyword link unit, a second identifier for an unselected keyword link unit, the assigned second weight for the unselected keyword link unit, and the corresponding unique token.

The first weight, the second weight, and the associated keyword link units may be used by the content item selection module 150 of the content item selection system 108 when ranking or scoring third-party content items for selection and serving with the landing page. For instance, third-party content items that are related to both the selected keyword link unit and the unselected keyword link units may have higher scores, based on the weighting, than scores for third-party content items that are only related to the selected keyword link unit. That is, if a selected keyword link unit is "insurance" and the unselected keyword link units are "cars" and "car insurance," then a first third-party content item for car insurance may have a higher score, since it is also related to the unselected keyword link units, than a third-party content item for home owners insurance. Thus, the unselected keyword link units and the assigned weights may provide additional contextual data to be used by the content item selection module 150 to select applicable third-party content items.

In the present example, process 900 includes identifying a group of keywords from the set of groups based on the received corresponding unique token (block 916). In some implementations, the identification may simply compare the received unique token to the unique tokens included or associated with the groups of keywords. Thus, the content item selection module 150 may utilize the unique token to retrieve the previously used group of keywords as contextual data in the selection of third-party content items.

A third weight may be assigned to one or more of the keywords of the identified group (block 918). For example, a third weight can be assigned to one or more of the keywords of the identified group, excluding the keyword for the selected keyword link unit. The third weight may be less than the first weight. For example, if the first weight is 100, then the third weight may be 20. In some implementations, the third weight may be greater than the second weight. For example, if the second weight is 20, then the third weight may be 30, 40, 50, etc. In some implementations, a predetermined number of keywords of the identified group of keywords (e.g., top 5, 10, 20, 50, 100 keywords) that is less than the total number of keywords in the identified group may be weighted instead of all the keywords in the identified group. In some other implementations, the weights may be linear (e.g., 100, 99, 98, 97, etc.), such as in the order of the keywords in the identified group. In still other implementations, the weights may be the scores generated for the keywords when the group of keywords was determined based on an analysis of the content of the resource (e.g., scores of 100, inclusive, to 1, inclusive).

The third weight and the associated one or more keywords from the identified group of keywords may be used by the content item selection module 150 of the content item selection system 108 when ranking or scoring third-party content items for selection and serving with the landing page. The other keywords in the identified group, based on the unique token, and the assigned third weights may provide additional contextual data to be used by the content item selection module 150 to select applicable third-party content items.

One or more third-party content items are selected (block 920), such as by the content item selection module 150. The selection of one or more third-party content items may be based, at least in part, on the selected keyword link unit, the assigned first weight, the unselected keyword link units, and the assigned second weights. In some implementations, the selection of one or more third-party content items may be further based on the one or more keywords of the identified group and the assigned third weight.

In an implementation, the content item selection module 150 performs an auction for a set of third-party content items to be selected. The content item selection module 150 may conduct a real-time auction among third-party content providers to determine which third-party content items are to be shown as part of the landing page. The content item selection module 150 may use a quality score to determine which third-party content items are selected for populating the landing page. The quality score may be based, at least in part, on the selected keyword link unit, the assigned first weight, the unselected keyword link units, the assigned second weights, the one or more keywords of the identified group, and/or the assigned third weight. The foregoing contextual data may be used by the content item selection module 150 to determine the relevance, such as via the quality score, of third-party content items. The resulting quality scores for the third-party content items in the auction may be used by the content item selection module 150, either alone or in conjunction with other data, such as auction bids, to determine which third-party content items are selected to populate the landing page. In some implementations, the quality score may be combined with a third-party content provider's auction bid to determine a final value for the third-party content item. Thus, a third-party content item having the highest auction bid may not be guaranteed to be selected by the content item selection module 150 if the quality score for the third-party content item is low.

After selecting one or more third-party content items to populate the landing page, the content item selection system transmits data to effect presentation of the selected third-party content items to the client device (block 922). The data may include text, images, code, etc. to effect presentation of the third-party content items. In some implementations, the content item selection system may transmit data for the landing page to the client device that includes one or more content items slots to display the selected third-party content items.

Figure 10:
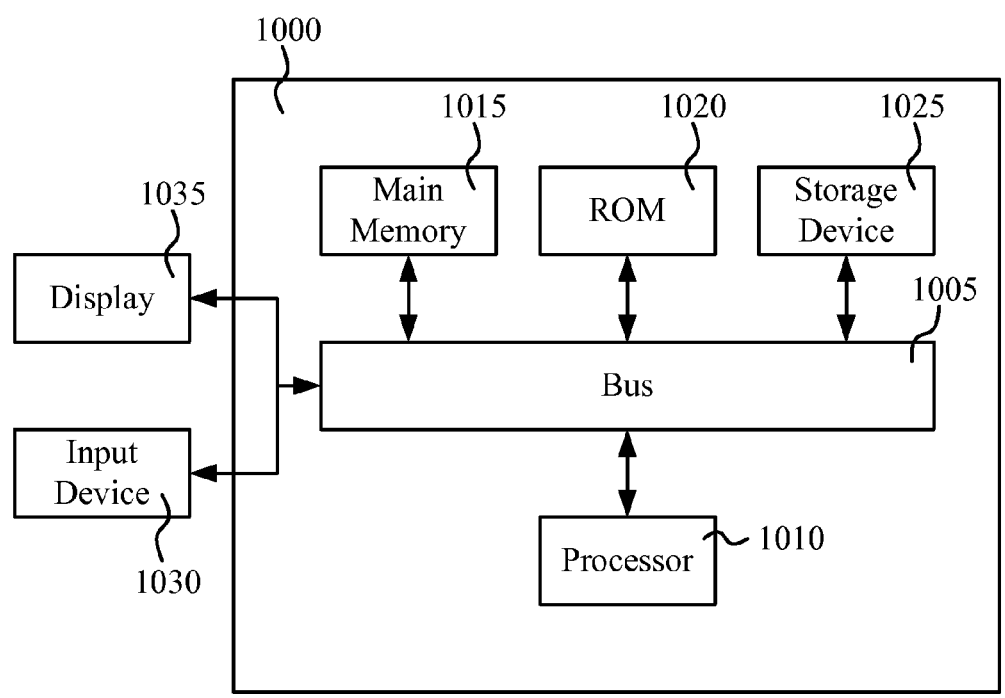
FIG. 10 is a block diagram illustrating a general architecture for a computer system that may be employed to implement various elements of the systems and methods described and illustrated herein.

FIG. 10 is a block diagram of a computer system 1000 that can be used to implement the client device 110, content item selection system 108, third-party content server 102, resource server 104, etc. The computing system 1000 includes a bus 1005 or other communication component for communicating information and a processor 1010 or processing module coupled to the bus 1005 for processing information. The computing system 1000 can include one or more processors 1010 or processing modules coupled to the bus for processing information. The computing system 1000 includes main memory 1015, such as a RAM or other dynamic storage device, coupled to the bus 1005 for storing information, and instructions to be executed by the processor 1010. Main memory 1015 can be used for storing position information, temporary variables, or other intermediate information during execution of instructions by the processor 1010. The computing system 1000 may include a ROM 1020 or other static storage device coupled to the bus 1005 for storing static information and instructions for the processor 1010. A storage device 1025, such as a solid state device, magnetic disk or optical disk, is coupled to the bus 1005 for persistently storing information and instructions. Computing device 1000 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 1000 may be coupled via the bus 1005 to a display 1035, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 1030, such as a keyboard including alphanumeric and other keys, may be coupled to the bus 1005 for communicating information and command selections to the processor 1010. In another implementation, the input device 1030 may be integrated with the display 1035, such as in a touch screen display. The input device 1030 can include a cursor control, such as a mouse, a trackball, or cursor direction keys, for communicating direction information and command selections to the processor 1010 and for controlling cursor movement on the display 1035.

According to various implementations, the processes and/or methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes and/or method steps described herein. One or more processors in a multi-processing arrangement may be employed to execute the instructions contained in main memory 1015. In alternative implementations, hard-wired circuitry may be used in place of or in combination with software instructions to effect illustrative implementations. Thus, implementations are not limited to any specific combination of hardware circuitry and software.

Although an example computing system 1000 has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can be implemented in combination in a single implementation. Conversely, various features described in the context of a single implementation can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A non-transitory computer readable storage device storing instructions that, when executed by one or more data processors, cause the one or more data processors to perform operations comprising:
   receiving a given search query from a user;
   providing, in response to receiving the given search query, a search results page that includes a set of search results that link to web pages identified as relevant to the given search query and a set of keyword link units that includes at least a first keyword link unit and a second keyword link unit;
   receiving a request for a landing page of the first keyword link unit that is initiated by user interaction with the first keyword link unit of the set of keyword link units, wherein the user interaction does not include user interaction with the second keyword link unit;
   receiving a request for a subset of content items to populate one or more content item slots of the landing page of the first keyword link unit when presented in response to the request for the landing page, wherein the request for the subset of content items to populate the one or more content item slots of the landing page of the first keyword link unit comprises a URL having a first identifier for the first keyword link unit, an assigned first weight, a second identifier for the second keyword link unit, and an assigned second different weight;
   identifying, in response to receiving the request for the subset of content items, a set of candidate content items for presentation in the one or more content item slots based on the user interaction with the first keyword link and the second keyword link unit that was presented on the search results page but was not interacted with by the user; and
   in response to receiving the request for the subset of content items to populate one or more content item slots of the landing page of the first keyword link unit, transmitting data to present, in the one or more content item slots of the landing page of the first keyword link unit, at least one of the candidate content items that was identified based on the second keyword link unit that was not interacted with by the user.

2. The non-transitory computer readable storage device of claim 1, wherein a first weight is assigned to the first keyword link unit and is greater than a second different weight which is assigned to the second keyword link unit.

3. The non-transitory computer readable storage device of claim 2, wherein the first weight is at least five times greater than the second different weight.

4. The non-transitory computer readable storage device of claim 1 storing instructions that cause the one or more data processors to further perform operations comprising:
   receiving data to present the landing page of the first keyword link having one or more content item slots; and
   presenting the landing page of the first keyword link populated with the at least one of the content items.

5. The non-transitory computer readable storage device of claim 1 storing instructions that cause the one or more data processors to further perform operations comprising:
   transmitting a request for a first-party resource, wherein a first-party resource includes a content item slot to present the set of keyword link units.

6. The non-transitory computer readable storage device of claim 5, wherein the set of keyword link units are selected based on content of the first-party resource.

7. The non-transitory computer readable storage device of claim 1, wherein the landing page presents the set of keyword link units that were included in the search results page.

8. A system for populating a landing page with content items, comprising:
   one or more data processors; and one or more storage devices storing instructions that, when executed by the one or more data processors, cause the one or more data processors to perform operations comprising:

receiving a given search query from a user;

providing, in response to receiving the given search query, a search results page that includes a set of search results that link to web pages identified as relevant to the given search query and a set of keyword link units that includes at least a first keyword link unit and a second keyword link unit;

receiving a request for a landing page of the first keyword link unit that is initiated by user interaction with the first keyword link unit of the set of keyword link units, wherein the user interaction does not include user interaction with the second keyword link unit;

receiving a request for a subset of content items to populate one or more content item slots of the landing page of the first keyword link unit when presented in response to the request for the landing page;

assigning weights, wherein assigning weights includes assigning a first weight to the first keyword link unit and assigning a second weight to the second keyword link unit, wherein the second weight is less than the first weight;

identifying, in response to receiving the request for the subset of content items, a set of candidate content items for presentation in the one or more content item slots based on the user interaction with the first keyword link and the second keyword link unit that was presented on the search results page but was not interacted with by the user; and in response to receiving the request for the subset of content items to populate one or more content item slots of the landing page of the first keyword link unit, transmitting data to present, in the one or more content item slots of the landing page of the first keyword link unit, at least one of the candidate content items that was identified based on the second keyword link unit that was not interacted with by the user.

9. The system of claim 8, wherein the instructions cause the one or more data processors to perform operations further comprising:

receiving data for the given search query, wherein the data contains content of the given search query, and determining a set of groups of keywords based on an analysis of the content of the given search query.

10. A computer-implemented method, comprising:

receiving a given search query from a user;

providing, in response to receiving the given search query, a search results page that includes a set of search results that link to web pages identified as relevant to the given search query and a set of keyword link units that includes at least a first keyword link unit and a second keyword link unit;

receiving a request for a landing page of the first keyword link unit that is initiated by user interaction with the first keyword link unit of the set of keyword link units, wherein the user interaction does not include user interaction with the second keyword link unit;

receiving a request for a subset of content items to populate one or more content item slots of the landing page of the first keyword link unit when presented in response to the request for the landing page;

assigning a first weight is to the first keyword link unit; and assigning a second different weight to the second keyword link unit, wherein the first weight is greater than the second different weight;

identifying, in response to receiving the request for the subset of content items, a set of candidate content items for presentation in the one or more content item slots based on the user interaction with the first keyword link and the second keyword link unit that was presented on the search results page but was not interacted with by the user; and in response to receiving the request for the subset of content items to populate one or more content item slots of the landing page of the first keyword link unit, transmitting data to present, in the one or more content item slots of the landing page of the first keyword link unit, at least one of the candidate content items that was identified based on the second keyword link unit that was not interacted with by the user.

* * * * *